June 23, 1964
M. W. WAITE
3,138,115
TRACTION MOTOR AXLE SUSPENSION
Filed April 18, 1962
2 Sheets-Sheet 1
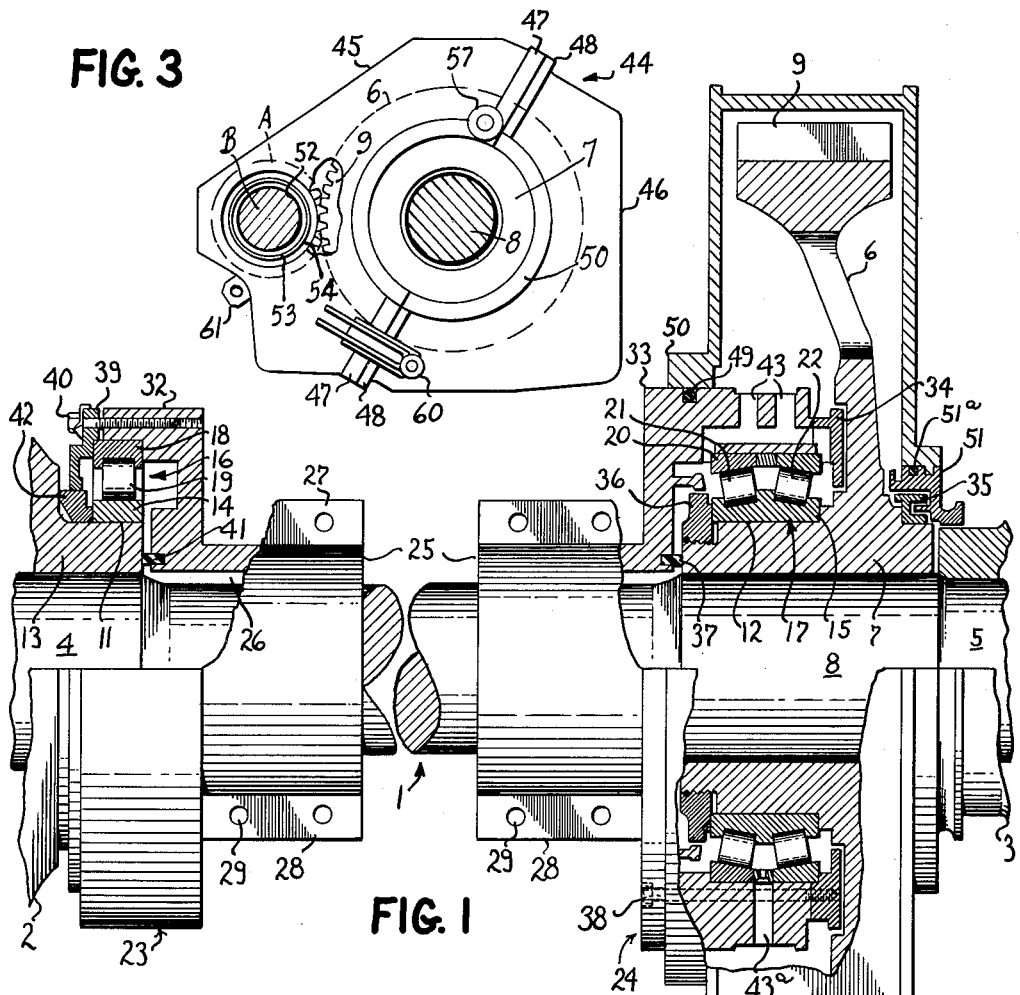
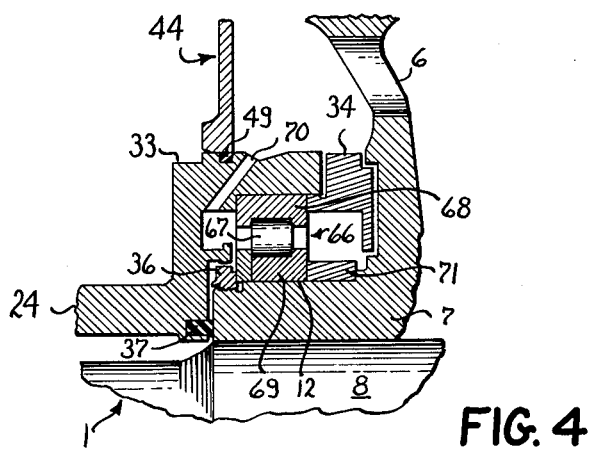
INVENTOR.
MALCOLM W. WAITE
BY Robert H. Montgomery
HIS ATTORNEY

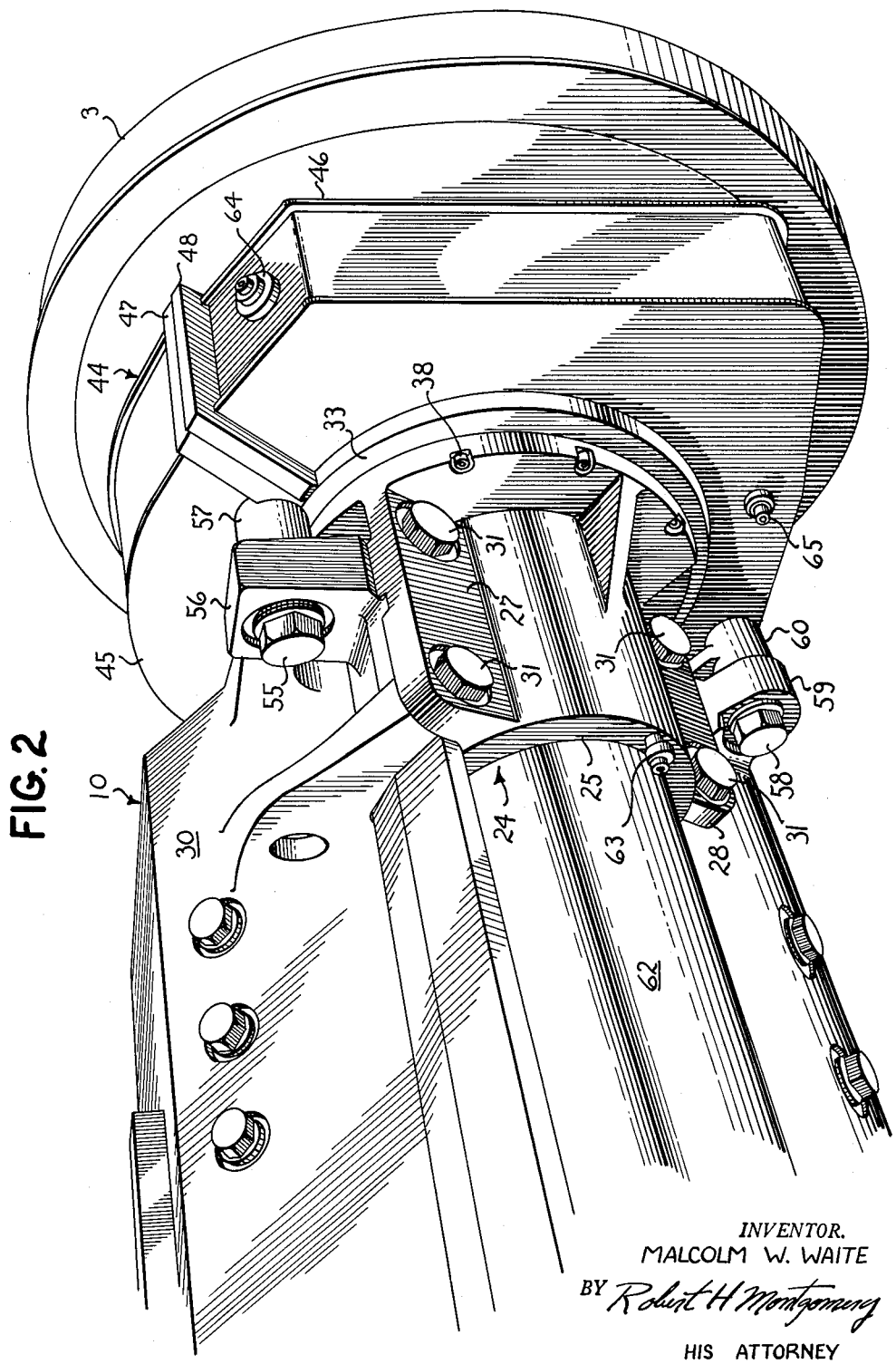

United States Patent Office 3,138,115
Patented June 23, 1964

3,138,115
TRACTION MOTOR AXLE SUSPENSION
Malcolm W. Waite, Erie, Pa., assignor to General
Electric Company, a corporation of New York
Filed Apr. 18, 1962, Ser. No. 188,465
8 Claims. (Cl. 105—136)

This invention relates to traction motor suspensions, and more particularly relates to traction motor axle suspensions.

It is conventional practice to power railroad locomotives with electric motors which are geared to an axle which supports a locomotive truck frame on portions thereof mounted in journal boxes and received within pedestals defined by the truck frame.

It has been the practice in the railway art to mount a traction motor on the axle which it drives by means of spaced apart two-part sleeve type axle bearings and axle caps which secure the motor frame about the sleeve type axle bearings on the axle. The other end of the traction motor is usually resiliently supported on a truck transom or crosstie. The axle bearings are provided with flanges which take up thrust loads exerted thereon by the adjacent wheel and axle gear upon lateral movement of the motor with respect to the axle.

Use of this conventional axle suspension requires a window to be provided in the axle bearing for lubrication of the journal portion of the axle, some device for continuously supplying lubricant thereto. The conventional lubricating arrangement comprises a wick providing communication between a lubricant reservoir defined in an axle cap and the axle through the window defined in the axle bearing. An example of such an axle bearing lubrication arrangement may be noted in U.S. Patent 2,640,743.

This sleeve type axle suspension of traction motors has found extremely wide utilization, and it is conventional practice at the present time, being used on more than 28,000 electrically propelled locomotives in the United States on this date. However, this sleeve bearing type of traction motor axle suspension leaves much to be desired in the way of maintenance and service life. Sleeve type axle bearings have an affinity to "wipe," i.e., the material providing the bearing surface of the sleeve type axle bearings may be wiped from the body of the bearing under conditions of high loading. Sleeve type axle bearings are highly sensitive to the finish and contour of the axle surface upon which they are mounted. Moreover, it is difficult to adequately seal sleeve type axle bearings against oil leakage, and in most instances, space limitations and geometry of the sleeve bearing and lubrication arrangement dictate that the lubrication window of the bearing be placed in a zone of high loading of the sleeve bearing. Also, wear of the sleeve type bearings causes spread in the motor-axle gearing which may lead to excessive backlash in the gearing.

It has been proposed to utilize anti-friction bearings to support a traction motor on an axle by mounting the anti-friction bearings directly on the axle at spaced apart locations, mounting a quill on the spaced bearings and then securing the motor about the quill. This type of construction which requires the additional quill, also presents assembly problems in that close manufacturing tolerances are required, and new motor axle mounting structure would be required. This type of construction has not been accepted by U.S. railroads.

In view of the known limitations of these prior traction motor axle suspensions, this invention provides a new and improved traction motor axle suspension on anti-friction bearings which is economical, easy to assemble, and which may be interchanged with existing traction motor sleeve bearing suspensions.

Accordingly, it is an object of this invention to provide a new and improved anti-friction bearing traction motor axle suspension.

It is a further object of this invention to provide an improved anti-friction bearing traction motor axle suspension which may be made interchangeable with prior art sleeve bearing traction motor suspensions.

It is another object of this invention to provide a new and improved anti-friction bearing traction motor axle suspension which is easily assembled and which is designed to take all lateral thrust between the motor and axle on one bearing.

Another object of this invention is to provide a traction motor axle suspension which provides improved concentricity between stationary and rotating parts and decreases vibration imparted to the motor.

Another object of this invention is to provide an improved traction motor suspension and axle gear assembly having improved lubricating and lubricant-retaining properties.

Briefly stated, the invention in one form thereof comprises the provision of anti-friction bearing means mounted on the hubs of the axle gear and wheel opposite thereof. Traction motor mounting means are carried by these anti-friction berings and are adapted to be bolted or otherwise secured to the motor frame in a manner which requires no modification to existing traction motors. Provision is further made for one of the bearings to take all lateral thrust between the motor and the axle on which the motor is mounted, and improved lubricant-sealing means are provided.

The features of the invention which are believed to be novel are set forth with particularity in the claims appended to and forming part of this specification. However, the organization and operation of the invention, together with further objects and advantages thereof, may best be understood by reference to the following detailed description taken in conjunction with the drawings wherein:

FIG. 1 illustrates a view partially in section of a wheel axle and gear assembly adapted to support a traction motor thereon in accordance with the invention;

FIG. 2 is a perspective view of a traction motor mounted on a wheel axle and gear assembly in accordance with the invention;

FIG. 3 is an elevation view of the traction motor gear case showing portions of the axle and motor shafts and the gear and pinion associated therewith; and FIG. 4 illustrates a modified bearing arrangement with respect to that shown on the axle gear of FIG. 1.

FIG. 1 illustrates an axle 1 having wheels 2 and 3 mounted on the ends thereof. Although only a portion of the hubs of wheels 2 and 3 are illustrated, it is to be understood that the wheels 2 and 3 are contemplated to be of the flange type adpted to engage and ride on railroad track. The wheels 2 and 3 are preferably mounted on the axle 1 in a conventional manner by being pressed on the wheel seat portions 4 and 5 respectively of axle 1. Although it is not deemed necessary for purposes of illustration, it will be understood that the axle 1 extends beyond the wheels 2 and 3 and are journaled in journal boxes which in turn are fitted in pedestal openings in a truck frame which supports a locomotive car body. Also mounted on axle 1 is axle gear 6 having a hub portion 7 which is pressed on axle seat portion 8 of axle 1.

Axle gear 6 has gear teeth 9 which are adapted to be driveably engaged by a pinion A on the motor shaft B of traction motor 10, FIG. 3. The nose end of the traction motor, not shown, is mounted on a transom or crosstie of the railway truck supported on the illustrated wheel and axle assembly. As hereinafter described in conjunction with FIG. 2, the axle end of traction motor 10 is supported or suspended on axle 1.

In accordance with the invention, means are provided for mounting the axle end of the traction motor on anti-friction bearings in an improved manner. As illustrated in FIG. 1, anti-friction bearing seats 11 and 12 are provided on the hubs 13 and 7 of wheel 2 and axle gear 6 respectively on the inboard sides thereof. The hubs 13 and 7 are machined about their outer peripheries to provide finished seats 11 and 12 for the inner races 14 and 15 of first and second anti-friction bearing assemblies 16 and 17, all respectively. The bearing assembly 16 further comprises an outer race 18 and bearing elements 19 illustrated as of the roller type. Bearing assembly 17 further comprises an outer race 20 and two rows of bearing elements 21 and 22. The bearing elements of each row, which are tapered or somewhat conical in shape, have their axis oppositely offset from the horizontal for reasons hereinafter described. Mounted on the outer races 18 and 20 of anti-friction bearing assemblies 16 and 17 respectively, are traction motor mounting or support members 23 and 24 for supporting the axle end of traction motor 10 on axle 1 through the bearing assemblies 16 and 17 and hubs 13 and 7. The outer race 20, as illustrated, comprises two bearing cups with an annular spacing member therebetween.

According to one aspect of the invention, the traction motor mounting means 23 and 24 are designed to allow modification of existing sleeve bearing traction motor axle mountings to anti-friction bearing mountings. To this end each of the mounting means 23 and 24 has a substantially semi-annular portion 25 of a radius sufficient to provide a clearance as indicated by numeral 26 between annular portion 25 and axle 1. The radius of the semi-annular portion 25 is selected to be of sufficient dimension to allow members 23 and 24 to be slipped over wheel seat portions 4 and axle gear seat 8 of axle 1 where necessary for purposes of assembly.

Each traction motor support member further comprises flanges 27 and 28 extending therefrom, which define a plurality of bolt-receiving apertures 29 therein. The apertures 29 are preferably relatively spaced and dimensioned to correspond to those of existing traction motor axle caps designed to fit about sleeve type axle bearings and be secured to a motor frame. As illustrated in FIG. 2, the flanges 27 and 28 of the traction motor mounting means are secured to the frame 30 of traction motor 10 by means of bolts 31 threaded into suitable receiving means provided by frame 30 through apertures 29.

The motor mounting members 23 and 24 further comprise annular portions 32 and 33 respectively, which are mounted on the outer races 18 and 20 of first and second bearing assemblies 16 and 17 respectively.

Further structure of the axle suspension of FIG. 1 may best be explained in conjunction with a description of a preferred manner of assembly thereof. Referring to the gear 6 and the bearings thereon, a sub-assembly is first made by placing bearing cap 34 over the hub 7 of gear 6. The inner race 15 of bearing assembly 17 is then pressed or otherwise fitted onto bearing seat 12 of hub 7 and an oil flinger 35 is pressed on the outboard side hub of gear 6 adjacent wheel 3. Locking ring 36 is then threaded on hub 7 to lock inner race 15 on hub 7. The gear 6 is then pressed on axle 1 at axle seat portion 8 therefor. An annular sealing member 37 adapted to make sealing engagement with hub 7, is then placed in a groove provided therefor in the inner vertical face of annular portion 33 of support member 24 and traction motor support means 24 is then slipped over the opposite end of the axle and mounted about the outer race 20 of bearing assembly 17 by means of a plurality of bolts 38 which extend through support member 24 into bearing cap 34. As the bolts 38 are tightened in bearing cap 34, they pull the annular portion 33 of traction motor support member 24 over the outer race 20 and secure the outer race in annular portion 33.

Next, the outer race 18 of bearing assembly 16, together with the bearing members 19 therein, is located in the annular portion 32 of traction motor support member 23. At this point the inner race 14 is not assembled with the bearing assembly 16 and the bearing elements are retained with the outer race by means of the bearing cage, not shown. Bearing cap 39 is then secured to the annular portion 32 by means of a plurality of bolts 40 to secure the outer race to the traction motor support member 23 and the bearing cavity defined by annular portion 32 and bearing cap 39 is packed with a suitable lubricant, not shown, for bearing assembly 16. An annular seal 41 adapted to make sealing engagement with hub 13 is then placed in a groove provided therefor in the inner vertical surface of traction motor mounting member 23 and this assembly is positioned over the axle. Oil flinger 42, which also aids in locating inner race 14, is pressed on the hub 13 of wheel 2. The inner race 14 of bearing assembly 16 is then pressed or otherwise mounted on the hub 13 at bearing seat 11 and the wheel 2 is pressed on the axle at wheel seat portion 4 provided therefor. The previously assembled sub-assembly of the traction motor mounting member 23, bearing cap 39 and bearing assembly 16 less inner race 14 are slipped onto inner race 14 and the complete assembly of FIG. 1 is now ready to be mounted in a railroad truck and have a traction motor secured thereto by means of bolts 31 through apertures 29, as illustrated in FIG. 2.

Referring to the traction motor mounting member 24, it will be noted that passageways 43 communicating with the interior of gear case 44 and leading down to the bearing assembly 17 are defined therein. The purpose of these passageways is to allow lubricant carried in the gear case 44 to enter these passageways and move therethrough to the bearing assembly 17 to provide lubrication therefor. A lubricant drain passage 43a is also provided in the lower portion of traction motor support member 24 to allow lubricant in the bearing to drain therefrom.

In accordance with one aspect of the invention, all lateral thrust between the traction motor 10 and the axle 1 is accepted by the second bearing assembly 17, which in the illustration of FIG. 1 comprises the tapered roller elements 21 and 22 having axes angled from the horizontal and complementary shaped inner and outer races to accept such lateral thrust. The first bearing assembly 16 may be described as a "floating" bearing in that sufficient clearance is provided between inner race 14 and outer race 18 as to allow the bearing elements 19 therebetween to move laterally with respect to inner race 14. As previously mentioned, the bearing assembly 16 is so dimensioned that the outer race 18 and the bearing elements may be slid off of the inner race 14. This feature of the invention provides two very definite advantages. First, the overall assembly shown in FIG. 1 can be made without the use of shims or the necessity of adjustment devices to compensate for misalignment due to inherent manufacturing tolerances. Secondly, the floating bearing at one end of the motor suspension alleviates any danger of binding or changing the amount of lateral clearance in the bearings due to a possible differential in the amount of thermal expansion. For example, if the motor 10 should be suddenly heated and the axle 1 remains cool, the frame of motor 10 might laterally expand as much as $\frac{1}{32}$ of an inch.

From a practical standpoint, a great advantage of the invention is that it may be used with existing traction motors with no modification thereto. For example, whenever it should be necessary or desirable to replace a wheel and axle assembly, the structure shown in FIG. 1 could be substituted for the conventional sleeve bearing type of suspension and the motor would be secured to the flanges 27 and 28 of traction motor mounting means 23 and 24 in the same manner that the motor was previously secured to the sleeve bearing axle caps. The particular feature of the invention which provides this interchangeability is the location of the traction motor support or suspension bearings on the wheel and gear hubs. Another advantage provided by the invention is that the bearing assembly 17 and the gear 6 and its driving pinion, not shown, may be lubricated with a common lubricant carried in the gear case.

When the traction motor support members 23 and 24 have been mounted on the hubs 13 and 7 respectively, the motor 10 may then be mounted on axle 1 through the support members 23 and 24. To accomplish this assembly, the motor 10 with portion 45 (see FIGS. 2 and 3) of gear case 44 thereon is secured to the flanges 27 and 28 of support members 23 and 24 by means of bolts 31. Portion 45 of gear case 44 is fitted about the periphery of the annular portion 33 of support member 24 and portion 46 of gear case 44 is secured around the remainder of the periphery of annular portion 33. The gear case portions 45 and 46 are secured together by means of flanges 47 and 48 respectively thereof being joined together by bolts, not shown, with appropriate gasketing or sealing means therebetween, not shown. Also provided in this assembly is an annular sealing member 49 between annular portion 33 of support member 24 and ledge 50 on gear case 44 and a sealing ring 51 with a sealing element 51a on the outboard side of gear case 44, which, in cooperation with oil flinger 35, forms a labyrinth seal about the outboard end of the hub 7 of gear 6.

In making this assembly, the shaft B of motor 10 with the pinion A thereon is first fitted into opening 52 in gear case portion 45 and an annular portion of the motor frame overhangs lip 53 and land 54 thereon extending from gear case portion 45. An annular resilient sealing member, not shown, is also positioned between lip 53 and the complementary portion of the housing of motor 10 to provide an effective seal therebetween. In FIG. 2 it will be further noted that portion 45 of gear case 44 is secured to the motor frame by means of a bolt 55 passing through a lug 56 on motor frame 30 and into bolt-receiving means 57 on gear case portion 45, bolt 58 passing through lug 59 on motor frame 30 into bolt-receiving means 60 extending from gear case portion 45, and also by a bolt through leg 61, FIG. 3, on gear case 44 threaded into receiving means on motor 10. To protect the axle against dirt, abrasive material, etc., a dust guard 62 may be provided which is formed to fit within the semi-annular portion 25 of support members 23 and 24. An adjustable dust guard locking cam 63 may be mounted on the semi-annular portions 25 of support members 23 and 24 to secure the dust guard in place. The gear case 44 may be provided with an oil inlet plug 64 near the top thereof and an oil drain plug 65 near the bottom thereof. An oil level checking plug, not shown, may also be provided in the lower portion of gear case 44. The nose end, not shown, of traction motor 10, is, upon assembly of the wheel axle and motor in a railroad truck, secured to a traction motor nose mounting means carried by a cross member of the truck.

As an alternate construction, the gear case could be split along a diameter of the opening 52. In this construction the axle gear 6 would then be placed in gear case portion 45 which would not be split along a diameter of the axle opening. The appropriate sub-assembly of bearing assembly 17 or 66, cap 34, flinger 35, etc. would be made on the gear 6 before insertion thereof in the gear case.

The particular type of the bearing designed to accept lateral thrust between motor 10 and axle 1 need not necessarily be as illustrated in FIG. 1, and in FIG. 4 another bearing arrangement designed to take up lateral thrust between the motor 10 and axle 1 is illustrated. FIG. 4 illustrates an arrangement wherein a bearing assembly 66 adapted to accept all loading due to lateral thrust between motor 10 and axle 1 and having a single row of bearing elements 67 of the roller type is utilized. It will be noted that the outer race 68 overhangs the ends of the bearing element 67, and the inner race 69, which is made in two parts, does likewise. In this arrangement, an oil passage 70 is provided in annular portion 33 in a slightly different arrangement than shown in FIG. 1. Also, the bearing cap 34 may be shaped slightly different than the bearing cap of FIG. 1. It will also be noted that a spacing element 71 of proper dimension is first positioned on bearing seat 12 of hub 7 prior to mounting inner race 69 thereon. Otherwise than stated, elements of FIG. 3 bearing like identifying numerals to those of FIG. 1 are the same as those of FIG. 1.

The disclosed construction provides several advantageous features. Inasmuch as the gear case 44 is split along a diameter thereof and makes good sealing engagement with the outer surface of annular portion 33 of traction motor support member 24, and since the bearing assembly 17 is effectively within the gear case 44, the gearing and bearing assembly 17 may be lubricated with a common lubricant. A straight mineral oil with antifoam and anti-rust additives has proved to be a satisfactory lubricant and replaces a crater type compound previously used to lubricate the pinion and axle gear. The crater type compound had the disadvantage of hardening at lower temperatures and when the axle gear was at rest.

The improved sealing arrangements at both the axle gear mounting and the wheel hub mounting reduces maintenance in that inspections and relubrications of the bearing assemblies 16 and 17 may be scheduled at less frequent intervals due to reduced lubricant consumption and lubricant leakage.

This invention allows greater control of concentricity between the rotating and stationary parts inasmuch as the problem of bearing wear associated with the sleeve type bearings is eliminated, and thus permits more efficient gear case seals which reduces lubricant leakage and allows the use of a high grade oil which further contributes to longer life of the gearing and greatly reduces deposition of oil on the rails which is detrimental to the tractive effort of the locomotive's travel thereon.

The invention further eliminates the necessity of providing journal finishes on the axle for the prior art type sleeve bearings. An additional advantage is that axles which may have been scored or damaged on their sleeve bearing journal finishes may be salvaged for use with this invention. Although the invention requires the machining of bearing seats 11 and 12 on the wheel hub 13 and axle gear hub 7 respectively, the provision of these machined bearing seats requires little additional labor inasmuch as the bearing seat 11 on wheel hub 13 may be machined at the same time the treads of the wheels are turned, and the provision of the bearing seat 12 on axle gear hub 7 may be accomplished in conjunction with other machining of the axle gear.

As previously mentioned, this construction further controls the amount of end play of the motor relative to the axle, and further compensates for any difference in expansion therebetween. Moreover, due to improved control of concentricity between the stationary and rotating elements (axle and traction motor support members) as compared to the sleeve type motor suspension bearing much more susceptible to wear, there will be a reduction of vibration imparted to the motor which will tend to increase the life of the motor.

While the invention has been described in a preferred form thereof, other embodiments of the invention and modifications of the disclosed embodiments of the invention may occur to those skilled in the art which do not depart from the spirit and scope of the invention. Accordingly, it is intended to cover in the appended claims all embodiments and modifications of the invention which do not depart from the spirit and scope of the invention.

What is claimed as new and is desired to secure by Letters Patent of the United States is:

1. An arrangement for suspending a traction motor on an axle having wheels mounted thereon adapted to be driven by said traction motor through a gear mounted on said axle which meshes with a pinion on the shaft of said motor, comprising: a first anti-friction bearing assembly mounted on the hub of one of said wheels on the inboard side thereof; a second anti-friction bearing assembly mounted on the hub of said gear on the inboard side thereof; traction motor mounting means carried on said first and second bearing assemblies, said traction motor mounting means arranged to have said traction motor secured thereto and support one end of said traction motor on said axle between said gear and said one of said wheels.

2. In combination, a wheel and axle assembly adapted to be driven by a traction motor through a gear mounted on said axle which meshes with a pinion on the shaft of said motor, comprising: a first anti-friction bearing assembly mounted on the hub of one of said wheels on the inboard side thereof; a second anti-friction bearing assembly mounted on the hub of said gear on the inboard side thereof; traction motor mounting means carried on said first and second bearing assemblies, said traction motor mounting means arranged to have said traction motor secured thereto and support one end of said traction motor on said axle between said gear and said one of said wheels; a gear case enclosing said gear and pinion and said second bearing assembly mounted on the hub of said gear.

3. The combination of claim 2 wherein lubricant passageways are defined in the traction motor mounting means supported on said second bearing assembly whereby lubricant carried in said gear case may enter into said bearing assembly.

4. An arrangement for suspending a traction motor on an axle having wheels mounted thereon adapted to be driven by said traction motor through a gear mounted on said axle which meshes with a pinion on the shaft of said motor, comprising: a first anti-friction bearing assembly mounted on the hub of one of said wheels on the inboard side thereof; a second anti-friction bearing assembly mounted on the hub of said gear on the inboard side thereof, each of said bearing assemblies comprising inner and outer races with bearing elements therebetween; traction motor mounting means carried on said first and second bearing assemblies, said traction motor mounting means arranged to have said traction motor secured thereto and support one end of said traction motor on said axle between said gear and said one of said wheels, one of said bearing assemblies being selected to allow movement of its outer race with respect to its inner race axially of said axle.

5. The arrangement of claim 4 wherein said first bearing assembly mounted on said wheel hub is selected to allow the axial movement of its outer race with respect to its inner race.

6. An arrangement for suspending a traction motor on an axle having wheels mounted thereon adapted to be driven by said traction motor through a gear mounted on said axle which meshes with a pinion on the shaft of said motor, comprising: a first anti-friction bearing assembly mounted on the hub of one of said wheels on the inboard side thereof; a second anti-friction bearing assembly mounted on the hub of said gear on the inboard side thereof, each of said bearing assemblies comprising inner and outer races with bearing elements therebetween; traction motor mounting means carried on said first and second bearing assemblies, said traction motor mounting means each comprising an annular portion mounted on the outer races of respective bearing assemblies and generally semi-annular portions extending therefrom about said axle, said semi-annular portions having flanges thereon adapted to have a traction motor secured thereto.

7. The arrangement of claim 6 further including a gear case adapted to enclose the gear and pinion, said bearing assembly on said axle gear hub being located within said gear case and the annular portion of the traction motor mounting means supported on said bearing assembly on said axle gear hub extending into said gear case.

8. The arrangement of claim 7 wherein lubricant passageways are defined in said annular portion of said traction motor mounting means in said gear case.

References Cited in the file of this patent
UNITED STATES PATENTS

| | | |
|---|---|---|
| 1,872,798 | Oelkers | Aug. 23, 1932 |
| 2,676,856 | Kohse | Apr. 27, 1954 |
| 2,770,507 | Ehnts | Nov. 13, 1956 |